United States Patent
Buettner

[11] Patent Number: 6,081,712
[45] Date of Patent: *Jun. 27, 2000

[54] METHOD AND SYSTEM FOR TRANSMITTING MESSAGES BETWEEN DEVICES OF A MOBILE RADIOTELEPHONE NETWORK

[75] Inventor: Hartmut Buettner, Haunetal, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/698,447

[22] Filed: Aug. 30, 1996

[30] Foreign Application Priority Data

Aug. 31, 1995 [DE] Germany .................. 195 32 185

[51] Int. Cl.⁷ ........................................ H04Q 7/20
[52] U.S. Cl. ................................ 455/433; 455/435
[58] Field of Search ....................... 455/432, 433, 455/435, 436, 422, 461; 707/104, 202

[56] References Cited

U.S. PATENT DOCUMENTS

| | | | |
|---|---|---|---|
| 5,153,902 | 10/1992 | Buhl et al. | 455/458 |
| 5,210,787 | 5/1993 | Hayes et al. | 455/432 |
| 5,400,390 | 3/1995 | Salin | 455/417 |
| 5,519,758 | 5/1996 | Tabbane | 455/432 |
| 5,537,467 | 7/1996 | Cheng et al. | 455/417 |
| 5,590,133 | 12/1996 | Billstrom et al. | 455/433 |
| 5,590,175 | 12/1996 | Gallant et al. | 455/433 |
| 5,590,398 | 12/1996 | Matthews | 455/432 |
| 5,594,942 | 1/1997 | Artic et al. | 455/433 |
| 5,745,852 | 4/1998 | Khan et al. | 455/433 |

OTHER PUBLICATIONS

"European digital cellular telecommunications system (Phase 2); Mobile Application Part (MAP) specification (GSM 09.02)", European Telecommunication Standard, Final Draft prETS 300 599: 1994 (GSM 09.02 version 4.9.0) pp. 19, 29–33, 136–137, 450, 85, 332–323.

"D900 Mobile Communication System, System Description SYD A30808–X3231–X–2–7618", Huder/Geier, Siemens AG 1992.

*Primary Examiner*—William G. Trost
*Assistant Examiner*—Jean A. Gelin
*Attorney, Agent, or Firm*—Hill & Simpson

[57] ABSTRACT

A method and system for storing database information in a central subscriber database to identify a central target subscriber database. A message containing subscriber data of the called radiotelephone subscriber are transmitted to a central target subscriber database. As a result messages containing inquiries to the central subscriber database are not answered directly, as is the case given a standardized transmission protocol, but are forwarded to another central subscriber database in the same mobile radiotelephone network, since the storing therein of the subscriber data for the radiotelephone subscriber is more advantageous or useful. The message branches to the central target subscriber database by using the database information entered in the original central subscriber database. The database information identifies the central target subscriber database.

13 Claims, 1 Drawing Sheet

METHOD AND SYSTEM FOR TRANSMITTING MESSAGES BETWEEN DEVICES OF A MOBILE RADIOTELEPHONE NETWORK

BACKGROUND OF THE INVENTION

1. Field of the Invention

The invention relates to a communications network and, in particular, to a method and system that transmits messages between devices of a mobile radiotelephone network.

2. Description of the Related Art

A digital, cellularly constructed mobile radiotelephone network according to the Global System for Mobile Communication Standard (GSM) is disclosed in the system documentation entitled "D900—Mobile Communication System. System Description SYD" 1992. Essential components of the radiotelephone network for transmitting speech and data include a base station system, a switching subsystem and an operating and maintenance subsystem. The base station system having a radio part and a wired part interfaces with the mobile stations of radiotelephone subscribers and the switching subsystem. The switching subsystem controls the switching functions in the mobile radiotelephone network. This includes setting up the connection between within the mobile radiotelephone network and other telecommunications networks on the basis of calls originating at or received by the radiotelephone subscribers.

The GSM specification 09.02, final draft, entitled "European Digital Cellular Telecommunications System (Phase 2)" November 1994, specifies a standardized transmission protocol for the international mobile radiotelephone network (Mobile Application Part—MAP), in order to standardize the handling of the special characteristics resulting from the mobility of the radiotelephone subscribers, or the corresponding mobile stations, during calling or data exchange across state borders. Messages are transmitted between the devices of the mobile radiotelephone network according to the standardized transmission protocol (MAP).

In the GSM mobile radiotelephone network, subscriber call numbers are assigned to the radiotelephone subscribers. The assigned call numbers are part of the subscriber data that is stored in a central subscriber database. A combination of digits positioned at the beginning of the subscriber call number, allows a call connection to always be made to the same determined central subscriber database in the mobile radiotelephone network. A location update of the radiotelephone subscriber, provides for a branching to take place to transmit the data to the correct central subscriber database based on the first digits of an international radiotelephone subscriber identification (IMSI). The IMSI is entered during the manufacturing of the Subscriber Identity Module (SIM) card and is allocated to the radiotelephone subscriber before the radiotelephone subscriber is set up in the network. The subscriber call number is not assigned until the radiotelephone subscriber is cleared for set up in the network.

It is not possible to freely allocate a subscriber call number for a radiotelephone subscriber that has a combination of digits to switch the call through to a subscriber database that is different than the determined central subscriber database without an increase in cost. In addition to the cost of having the desired subscriber call number set up, a cost increase is necessary in order to set up an unconditional call forwarding number that corresponds to the subscriber call number containing the combination of digits identifying the predetermined subscriber database for the radiotelephone subscriber. The last-named subscriber call number is not outwardly visible, but is used by the mobile radiotelephone network operator for an assignment to a different radiotelephone subscriber. As a result two subscriber call numbers are used to identify the radiotelephone subscriber from the possible plurality of subscriber call numbers available to the network operator. This additional performance feature of call forwarding is incorporated prior to the radiotelephone subscriber's request for the feature. As a result problems arise with respect to displaying the subscriber call number as well as determining the fees to be charged for the respective call.

SUMMARY OF THE INVENTION

It is an object of the present invention to achieve a method and a system for transmitting messages within a mobile radiotelephone network that is more flexible in handling message transmissions at the lowest possible additional expense.

This object is achieved by storing database information in the central subscriber database to identify a central target subscriber database. Messages are transmitted to the central target subscriber database that stores the subscriber data of the radiotelephone subscriber. Messages containing inquiries to the central subscriber database are not answered directly as in the standardized transmission protocol (e.g. MAP) but are forwarded to another central subscriber database in the same mobile radiotelephone network. The messages are forwarded since the storing of the subscriber data for the radiotelephone subscriber in the central target subscriber database is more advantageous and useful. Branching to the central target subscriber database is easily accomplished by using the database information. The database information identifies the central target subscriber database. As a result more flexible capabilities in organizing the mobile radiotelephone network and in managing the radiotelephone subscribers and their subscriber data, are available at a nominal expense.

The invention is explained in more detail on the basis of an exemplary embodiment shown in the figures.

DETAILED DESCRIPTION OF THE PREFERRED EMBODIMENTS

Figure 1:
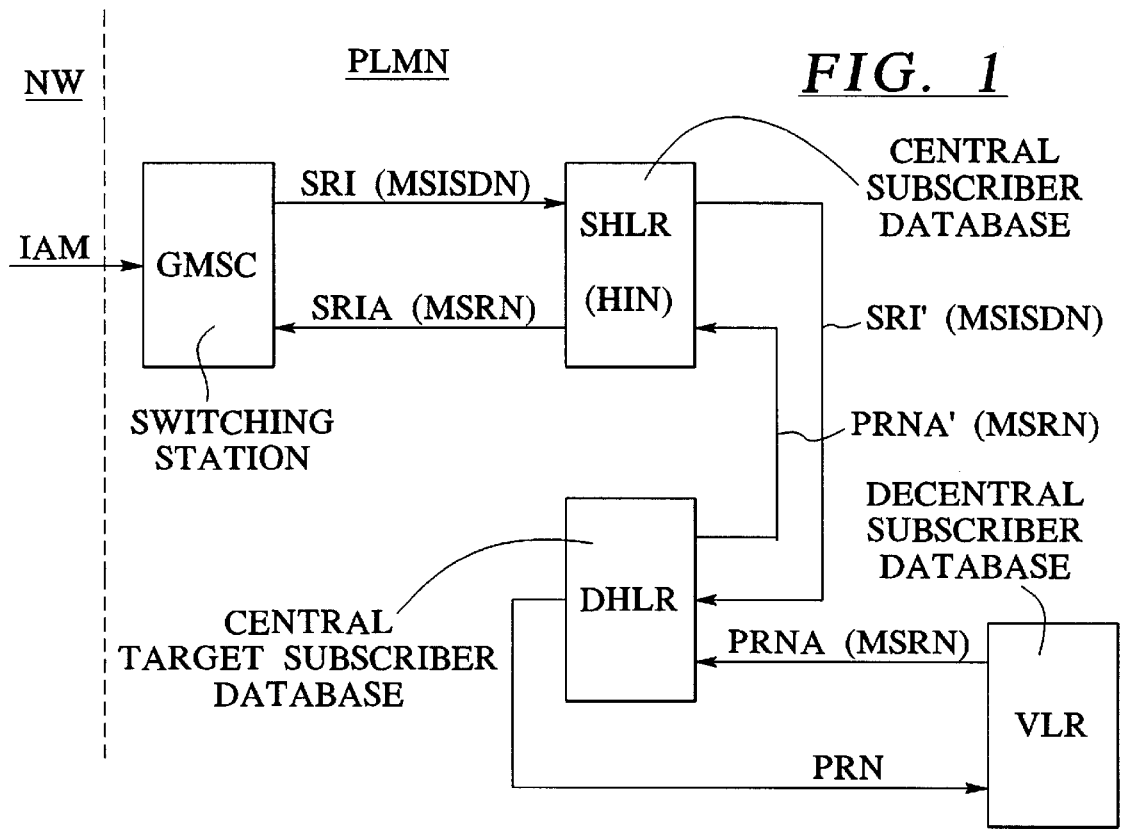
FIG. 1 is a schematic diagram illustration the flow of messages between the devices of the mobile radiotelephone network given a location inquiry based on a call directed to the radiotelephone subscriber.

Figure 1 shows the transmission of messages between devices of a mobile radiotelephone network PLMN according to the GSM standard. The message flow cased on a call directed to the radiotelephone subscriber involves a mobile switching station (Gateway Mobile Switching Center) GMSC, a central subscriber database SHLR, a central target subscriber database DHLR and a decentral subscriber database VLR. The mobile switching station GMSC interfaces with other networks in the mobile radiotelephone network PLMN and receives an initial address message IAM. The initial address message IAM signals the arrival of an incoming call to the mobile radiotelephone network PLMN. The call is initiated by a subscriber of another telecommunications network network NW. The telecommunications network NW consists of a were-bound fixed network so that the calling subscriber is a fixed network subscriber, or of another mobile radiotelephone network.

In order to switch the call through to the called radiotelephone subscriber, the mobile switching station GMSC immediately transmits a message SRI with a location inquiry and a subscriber call number MSISDN to a central subscriber database SHLR. A combination of digits at the beginning of the subscriber call number MSISDN locates the central subscriber database SHLR closest to the called radiotelephone subscriber. The subscriber call number MSISDN of the called radiotelephone subscriber is sent to the central subscriber database SHLR along with the location inquiry contained in the message SRI. The location inquiry serves to determine the location of the called radiotelephone subscriber. The location which changes due to the mobility of the radiotelephone subscriber, can be identified based on an area number that designates a local area where a decentral subscriber database VLR stores the subscriber data for the duration of time that the radiotelephone subscriber remains in that local area.

The subscriber call number MSISDN for the called radiotelephone subscriber includes the combination of digits that determines which central subscriber database SHLR will handle the call. Database information HIN is set up in the central subscriber database SHLR that receives the message SRI with the location inquiry. The database information HIN selects the central target subscriber database DHLR that is storing the entire subscriber data set pertaining to the called radiotelephone subscriber. Thus it is not necessary to set up the entire subscriber data set for the radiotelephone subscriber in the central subscriber database SHLR. Only the subscribe, call number MSISDN needs to be stored with the database information HIN. The database information HIN forwards the location inquiry from the original central subscriber database SHLR to the central target subscriber database DHLR in a new message SRI' containing the subscriber call number MSISDN. The selected central target subscriber database DHLR stores the entire subscriber data set locating the called radiotelephone subscriber. The radiotelephone subscriber can be freely assigned a desired subscriber call number MSISDN that is independent of the allocation to the central subscriber database SHLR. The desired call number MSISDN begins with digits, based on which calls are routed to the central subscriber database SHLR other than the ones designated for the international radiotelephone subscriber identification (IMSI).

Distinguishable from the transmission protocol standardized for the GSM mobile radiotelephone network incoming messages in the central subscriber database SHLR are not directly answered in this embodiment. The incoming messages are forwarded to a further central target subscriber database DHLR in its own mobile radiotelephone network PLMN. This forwarding occurs because the storing of the subscriber data for the radiotelephone subscriber in this additional central target subscriber database DHLR is more advantageous and useful. The result is a high degree of flexibility with respect to organizing the mobile radiotelephone network and managing the subscriber data of radiotelephone subscribers.

Assume that the central subscriber database SHLR is located in Munich. The central subscriber database SHLR receives a location inquiry from the mobile switching station GMSC for a location of the called radiotelephone subscriber. Assume also that the called radiotelephone subscriber is actually registered with his subscriber data set in the central subscriber database DHLR in Hamburg. The central subscriber database SHLR in Munich then starts a location inquiry and directs it in the new message SRI' to the central subscriber database DHLR in Hamburg. In the central subscriber database SHLR in Munich the information database HIN for identifying the central subscriber database DHLR in Hamburg is set up under the subscriber call number MSISDN of the called radiotelephone subscriber.

The result of the location inquiry is transmitted back from the central subscriber database DHLR in Hamburg to the central subscriber database SHLR in Munich, which forwards the requested information to the requesting mobile switching station GMSC. The mobile switching station GMSC does not remark that the requested information was actually retrieved from the central subscriber database DHLR in Hamburg nor from the central subscriber database SHLR in Munich, to which the location inquiry was directed. In comparison to call forwarding the desired subscriber call number in Munich to the other subscriber call number in Hamburg only one subscriber call number MSISDN is required according to the invention and is set up in both central subscriber databases. For the radiotelephone subscriber, the entire subscriber data set is set up in the central target subscriber database DHLR. A reference to the central target subscriber database DHLR the stored subscriber data set is set up in the original central subscriber database SHLR in the form of the information database HIN.

An advantageous application of the call handling according to the invention is that the location inquiries in the mobile radiotelephone network PLMN continue to go only to a single central subscriber database SHLR in the mobile radiotelephone network PLMN. This central subscriber database SHLR forwards the location inquiry to the correct central target subscriber database DHLR. As a result, international agreements concerning optimized routing in which inquiries from foreign telecommunication networks are routed directly to the central subscriber databases, bypassing the mobile switching stations at the interfaces to these telecommunication networks, are greatly simplified.

After the new message SRI' containing the subscriber call number MSISDN with the location inquiry is received by the central target subscriber database DHLR, the central target subscriber database DHLR directs a roaming inquiry (Provide Roaming Number) PRN to a decentral subscriber database VLR. As a response to the roaming inquiry PRN, the decentral subscriber database VLR transmits a mobility number (Mobile Subscriber Roaming Number) MSRN in a message PRNA back to the central target subscriber database DHLR to determine the location of the called radiotelephone subscriber. The decentral subscriber database VLR is the subscriber database in which the called radiotelephone subscriber with the corresponding subscriber data is registered until he leaves the local area and falls under the jurisdiction of another decentral subscriber database VLR. The received mobility number MSRN is transmitted from the central target subscriber database DHLR to the central subscriber database SHLR in a corresponding message PRNA'. The central subscriber database SHLR transmits the mobility number MSRN back to the requesting mobile switching station GMSC in a message SRIA as a response to the location request.

Figure 2:
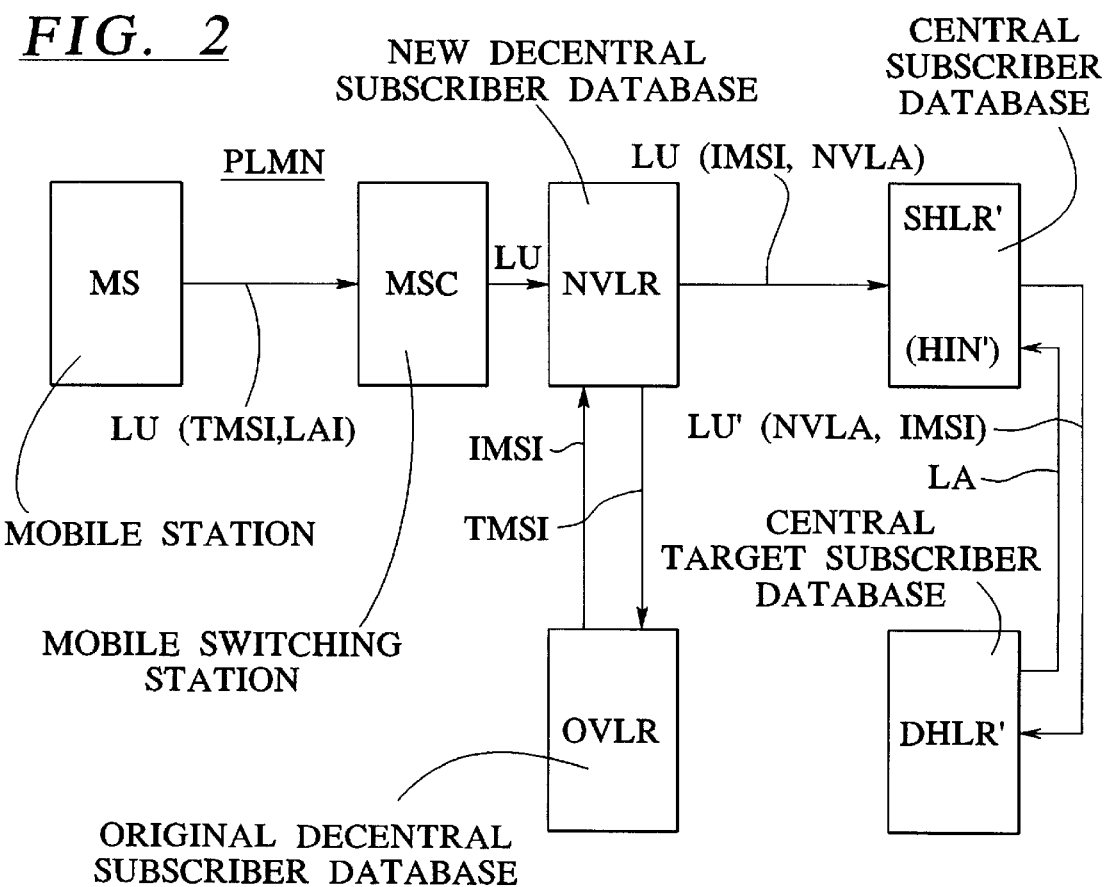
FIG. 2 is a schematic diagram of the flow of messages between the devices of the mobile radiotelephone network given an inquiry based on a location update of the radiotelephone subscriber.

FIG. 2 shows an embodiment for forwarding messages in a way that does not conform to the GSM standard. In FIG. 2 the messages are directed to a central subscriber database SHLR'. The message flow between the devices of the mobile radiotelephone network PLMN is illustrated when, given a location update of the radiotelephone subscriber, a request to renew information regarding the current location of the radiotelephone subscriber is directed to the central subscriber database SHLR'. It is necessary to keep current the information regarding the location of the radiotelephone subscriber as soon as the radiotelephone subscriber moves from a first local area to a new local area, whereby the subscriber data in the decentral subscriber database VLR or in the central subscriber database SHLR' must be modified. The devices of the mobile radiotelephone network PLMN involved in the message flow consist of a mobile station MS, a mobile switching station MSC, an original decentral subscriber database OVLR for the old local area and a new decentral subscriber database NVLR for the new local area a central subscriber database SHLR' and a central target subscriber database DHLR'.

The mobile station MS transmits a message Location Update LU to the mobile switching station MSC. A location area number LAI and a temporary subscriber identification TMSI are transmitted in the message LU. The new decentral subscriber database NVLR qualified due to the location update of the radiotelephone subscriber is connected to the mobile switching station MSC. The new decentral subscriber database NVLR recognizes from the arriving message LU that the transmitted local area identification LAI does not belong to the new local area, and requests an international radiotelephone subscriber identification number IMSI for the radiotelephone subscriber from the previous original decentral subscriber database OVLR. The temporary subscriber identification TMSI is transferred to the previous decentral subscriber database OVLR.

In the message LU, the new decentral subscriber database NVLR directs an inquiry to the central subscriber database SHLR', with which the international radiotelephone subscriber identification number IMSI and the address NVLA of the decentral subscriber database NVLR are transmitted. Under the radiotelephone subscriber identification number IMSI, the central subscriber database SHLR' stores an information database HIN a branching takes place to the central target subscriber database DHLR'. The central subscriber database SHLR' starts a new message LU' with the corresponding inquiry in which the international radiotelephone subscriber identification number IMSI and the address NVLA are contained. The central target subscriber database DHLR' is understood as the central background subscriber database, in which the subscriber data of the radiotelephone subscriber are set up. Thus, the message LU is exchanged between the central subscriber database SHLR', provided for processing the inquiry, and the background subscriber database DHLR', in order to maintain operation in the event of a failure of the central subscriber database SHLR'. The radiotelephone subscribers are again reachable after setting up the call connection by the respective mobile switching station MSC to the central background subscriber database DHLR'. This is possible because the central background subscriber database DHLR' continually receives the information concerning the location of the radiotelephone subscriber in the message LU'. As soon as the cells are switched through to the central background subscriber database DHLR' in all decentral subscriber databases VLR of the mobile radiotelephone network PLMN, messages LU for the renewing of the information upon a location update of the radiotelephone subscriber can be transmitted again. As a response to the incoming message LU, an acknowledge message LA is transmitted back to the central subscriber database SHLR' by the central background subscriber database DHLR', in order to confirm the receipt of the transmitted information.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. A method for transmitting messages between devices of a mobile radiotelephone network, wherein said messages are messages received based on a call to a radiotelephone subscriber, the method comprising the steps of:

providing at least one central subscriber database;

providing one central target subscriber database in which subscriber data of the radiotelephone subscriber are non-temporarily stored;

storing database information for identification of the central target subscriber database in said at least one central subscriber database;

storing a subscriber call number of the radiotelephone subscriber with said database information as subscriber datum in said at least one central subscriber database for said messages;

identifying said central target subscriber database from said database information;

receiving messages by said at least one central subscriber database;

transmitting said message to said central target subscriber database identified in said identifying step on a basis of stored database information;

initiating a new message containing a location inquiry when said message contains a location inquiry, said new message being initiated with the subscriber call number by said at least one central subscriber database;

directing said new message to said central target subscriber database including forwarding a request for a mobility number of the central target subscriber database by said at least one central subscriber database;

providing at least one noncentral subscriber database;

directing a roaming inquiry to said at least one noncentral subscriber database;

transmitting said mobility number back to said central target subscriber database as a response to said roaming inquiry; and transmitting said mobility number back to said at least one central subscriber database as a response to said message containing the location inquiry being received.

2. The method according to claim 1 further comprising the steps of:

receiving a message containing a new location inquiry when the location of the radiotelephone subscriber changes;

initiating a new message containing said news location inquiry; and directing said new message from said at least one central subscriber database to said central target subscriber database.

3. The method according to claim 2, further comprising the steps of:

providing a new decentral subscriber database in what subscriber data of the radiotelephone subscriber is stored for a duration of a jurisdiction of said new decentral subscriber database over said radiotelephone subscriber due to a location change of said radiotelephone subscriber;

transmitting an address of said new decentral subscriber database by said central subscriber database to said central target subscriber database; and transmitting a radiotelephone subscriber identification number by said at least one central subscriber database to said central target subscriber database.

4. The method according to claim 2 further comprising the steps of:

using the central target subscriber database as a background subscriber database to make available the subscriber data stored for the radiotelephone subscriber upon a failure of the central subscriber database.

5. The method according to claim 1 further comprising the steps of:

freely assigning a subscriber call number to the radiotelephone subscriber;

routing calls to the central target subscriber database based on the subscriber call number, said routing being independent of an allocation to the at least one central subscriber database as determined by a radiotelephone subscriber identification number.

6. A system for transmitting messages between devices of a mobile radiotelephone network, wherein said messages are messages received based on a call to radiotelephone subscriber, the system comprising:

at least one central subscriber database containing database information including a subscriber call number of the radiotelephone subscriber;

a central target subscriber database containing non-temporarily stored subscriber data of the radiotelephone subscriber, said central target subscriber database being connected to said at least one central subscriber database to receive messages from said at least one central subscriber database;

said at least one central subscriber database being operable to transmit a message to said central target subscriber database, based on said database information contained in said at least one central subscriber database when said messages are received by said at least one central subscriber database, and to initiate a new message containing a location inquiry when said message contains a location inquiry, said new message being initiated with the subscriber call number;

said new message being directed to said central target subscriber database, wherein said at least one central subscriber database forwards a request for a mobility number of the central target subscriber database;

at least one noncentral subscriber database adapted to receive a roaming inquiry from said central target subscriber database;

said at least one noncentral subscriber database being operable to transmit said mobility number back to said central target subscriber database as a response to said roaming inquiry; and said central target subscriber database being operable to transmit said mobility number back to said at least one central subscriber database as a response to said message containing the location inquiry being received.

7. A method for transmitting messages between devices of a mobile radiotelephone network, having a radiotelephone subscriber, the system comprising:

forwarding a first message, containing a subscriber call number to at least one central subscriber database;

transmitting a second message, containing said subscriber call number, from said at least one central subscriber database to a central target subscriber database;

transmitting a request for a mobility number, for determining the location of the radiotelephone subscriber, to a decentral subscriber database from said central target subscriber database in which said radiotelephone subscriber is located;

transmitting a third message containing said mobility number back to said central target subscriber database from said decentral subscriber database;

transmitting a fourth message containing said mobility number to said central subscriber database; and forwarding a fifth message containing said mobility number as a response to said first message.

8. A method for transmitting messages between devices of a mobile radiotelephone network, having a radiotelephone subscriber, the method comprising the steps of:

providing at least one central subscriber database;

providing one central target subscriber database in which subscriber data of the radiotelephone subscriber are non-temporarily stored;

storing database information for identification of the central target subscriber database in said at least one central subscriber database;

identifying said central target subscriber database from said database information;

receiving messages by said at least one central subscriber database;

transmitting said message to said central target subscriber database identified in said identifying step on a basis of stored information;

receiving a message containing a new location inquiry when the location of the radiotelephone subscriber changes;

initiating a new message containing said new location inquiry;

directing said new message from said at least one central subscriber database to said central target subscriber database;

providing a new noncentral subscriber database in which subscriber data of the radiotelephone subscriber is stored for a duration of a jurisdiction of said new noncentral subscriber database over said radiotelephone subscriber due to a location change of said radiotelephone subscriber;

transmitting an address of said new noncentral subscriber database by said at least one central subscriber database to said central target subscriber database; and transmitting a radiotelephone subscriber identification number by said at least one central subscriber database to said central target subscriber database.

9. The method according to claim 8, wherein said messages are messages received on a call to a radiotelephone subscriber, and further comprising the steps of:

storing a subscriber call number of the radiotelephone subscriber with said database information as subscriber datum in said at least one central subscriber database for said messages;

initiating a new message containing a location inquiry when said message contains a location inquiry, said new message being initiated with the subscriber call number by said at least one central subscriber database; and directing said new message to said central target subscriber database.

10. The method according to claim 9, wherein the step of directing said new message to said central target subscriber database further comprises the steps of:

forwarding a request for a mobility number of the central target subscriber database by said at least one central subscriber database; and further comprising the additional steps of:

providing at least one noncentral subscriber database;

directing a roaming inquiry to said at least one noncentral subscriber database;

transmitting said mobility number back to said at least one central target subscriber database as a response to said roaming inquiry; and transmitting said mobility number back to said at least one central subscriber database as a response to said message containing the location inquiry being received.

11. The method according to claim 8, further comprising the step of:

using the central target subscriber database as a background subscriber database to make available the subscriber data stored for the radiotelephone subscriber upon a failure of the at least one central subscriber database.

12. The method according to claim 8, further comprising the steps of:

freely assigning a subscriber call number to the radiotelephone subscriber;

routing calls to the central target subscriber database based on the subscriber call number, said routing being independent of an allocation to the at least one central subscriber database as determined by a radiotelephone subscriber identification number.

13. A system for transmitting messages between devices of a mobile radiotelephone network, having a radiotelephone subscriber, the system comprising:

at least one central subscriber database containing database information;

a central target subscriber database containing nontemporarily stored subscriber data of the radiotelephone subscriber, said central target subscriber database being connected to said at least one central subscriber database to receive messages from said at least one central subscriber database;

said at least one central subscriber database being operable to transmit a message to said central target subscriber database based on said database information contained in said at least one central subscriber database when said messages are received by said at least one central subscriber database;

said at least one central subscriber further being operable to receive a message containing a new location inquiry when the location of the radiotelephone subscriber changes, initiate a new message containing said new location inquiry, and direct said new message to said central target subscriber database;

a noncentral subscriber database in which subscriber data of the radiotelephone subscriber is stored for a duration of a jurisdiction of said noncentral subscriber database over said radiotelephone subscriber due to a location change of said radiotelephone subscriber; and said at least one central subscriber database being operable to transmit an address of said noncentral subscriber database and a radiotelephone subscriber identification number to said central target subscriber database.

* * * * *